US008275654B2

(12) United States Patent
Taudes et al.

(10) Patent No.: US 8,275,654 B2
(45) Date of Patent: Sep. 25, 2012

(54) COMPUTER IMPLEMENTED METHOD FOR SCORING CHANGE PROPOSALS

(75) Inventors: Alfred Taudes, Vienna (AT); Hannes Leo, Bisamberg (AT)

(73) Assignee: Community-Based Innovation Systems GmbH, Bisamberg (AT)

( * ) Notice: Subject to any disclaimer, the term of this patent is extended or adjusted under 35 U.S.C. 154(b) by 0 days.

(21) Appl. No.: 13/032,505

(22) Filed: Feb. 22, 2011

(65) Prior Publication Data

US 2012/0215593 A1 Aug. 23, 2012

(51) Int. Cl.
*G06F 11/00* (2006.01)
*G07C 13/00* (2006.01)
(52) U.S. Cl. .......................................... 705/12; 235/386
(58) Field of Classification Search ...................... 705/12
See application file for complete search history.

(56) References Cited

U.S. PATENT DOCUMENTS

2003/0233274 A1* 12/2003 Urken et al. ..................... 705/12
2005/0228714 A1* 10/2005 Spady ............................. 705/12

FOREIGN PATENT DOCUMENTS

WO WO 2009065211 A1 * 5/2009

OTHER PUBLICATIONS

De Liddo, Anna et al.; "Capturing and Representing Deliberation in Participatory Planning Practices" Open Research Online; The Open University's repository of research publications and other research outputs; Conference on Online Deliberation (OD2010); Jun. 30-Jul. 2, 2010, Leeds UK, 13pp.
Efremov, Roman et al.; "A framework for participatory decision support using Pareto frontier visualization, goal identification and arbitration" European Journal of Opertaional Reseach 199 (2009); pp. 459-467.
Ehtamo, Harri et al.; "Searching for joint gains in multi-part negotiations"; Theory and Methodology; European Journal of Operational Research 130 (2001); pp. 54-69.
Kim, Jinbaek; "A model and case for supporting participatory public decision making in e-democracy"; Group Decis Negot (2008) 17; pp. 179-193.
Insua, David Rios et al.; "Multicriteria e-Negotiation Systems for e-Democracy"; Journal of Multi-Criteria Decision Analysis 12 (2003); pp. 213-218.
Rios, Jesus et al; "Balanced increment and concession methods for negotiation support"; Revista De La Real Academia De Ciencias Exactas, Fisicas Y Naturales; Serie A: Matematicas; Madrid, Spain; pp. 41-56.

* cited by examiner

*Primary Examiner* — James A Reagan
(74) *Attorney, Agent, or Firm* — Christie, Parker & Hale, LLP.

(57) ABSTRACT

A method for scoring changes of components of a concept by a group of evaluators in a collective decision process is presented. First, the level of disagreement with the components is collected together with comments indicating desired changes. The expected incremental decrease of the overall disagreement level achievable by a component change is computed for a given probability that a formulation can be found that is acceptable by both agreeing and disagreeing evaluators. Performing this computation for different values of the compromise probability yields a score indicating the expected incremental decrease in overall disagreement achievable by a component change. Additionally, the minimum compromise probability where an improvement is possible and the expected relative improvements are provided. Next, alternative formulations for the selected components are drafted and subjected to a second round of voting. For each component the alternative yielding the maximum incremental improvement of overall consent is selected, where the sequence in which the components are scrutinized is determined by the score computed in the first step. In this way, an optimal new version of the concept is produced.

16 Claims, 3 Drawing Sheets

112 — determining the component not in the set of considered components whose change yields the largest positive expected incremental decrease of overall disagreement for the given compromise probability, applying the respective transformation to the voting matrix, computing the relative improvement as the ratio of the expected incremental decrease of overall disagreement and the overall disagreement level of the first voting matrix and adding the component to the set of considered components. If this component is not element in the sequence of consent increasing components, incrementing the score by 1 and assigning it to the component, appending the component to the sequence of consent increasing components, and recording the compromise probability as the minimum compromise probability of the component 114 — computing a scoring of the evaluators, according to a slope of the overall disagreement function 116 — generating a first list including the scored components detailing the respective non-neutral votings of the evaluators, and a second list including the scored evaluators detailing respective non-neutral votings 118 — selecting the components to be modified on the basis of said lists 120 — drafting alternative formulations for the selected components according to the comments 122 — assembling second round voting matrices containing a level of agreement and a level of disagreement for the alternatives per component

FIG. 1B

COMPUTER IMPLEMENTED METHOD FOR SCORING CHANGE PROPOSALS

FIELD OF INVENTION

The present invention relates generally to the field of decision making analysis, and more particularly to a method for scoring change proposals of a concept with regard to the potential to increase consent by relevant parties.

BACKGROUND

Collective decision making has a long tradition in legislative processes through the concept of a consultation. For example, a lawmaker may invite a selected group of stakeholders to provide feedback on a draft of a new proposal, such as, a legislative document structured into sections and paragraphs to integrate hitherto unknown aspects and to gain consent for the proposal. The same principle applies to construction plans, where components refer to different modules or aspects of the project. While the collection of feedback from stakeholders is often mandatory in these two fields, policy and strategy papers, organizational designs and product/service descriptions lend to this natural decomposition structure, too. Therefore, consultations with members of an organization and user communities are an attractive means to increase the efficiency and effectiveness of organizational change and new product development processes, especially as today the internet has dramatically lowered the transaction costs for both the proponent and the evaluators when compared to traditional media.

However, the ease at which feedback can be gathered via electronic means comes at the price of making the process of selecting those proposals for component changes that actually increase overall agreement by the community complex and error-prone due to the sheer number of possibly conflicting change proposals. The invention therefore provides an automatic method that helps the proponent to select those changes that have the greatest potential to increase consent to the concept by relevant evaluators.

SUMMARY

In some embodiments, the present invention is a method, executed by an electronic device, for scoring proposed changes of components of a concept for feedback by a plurality of evaluators. The method includes: electronically collecting a level of agreement and a level of disagreement for the components of the concept in a first voting matrix, where disagreeing votes have a negative value, agreeing votes have a positive value and neutral votes have a 0 value; electronically collecting comments indicating desired changes to the components, from the plurality of evaluators; defining an overall disagreement function as a measure of a total of said collected level of disagreement with the concept as a whole that maps said first voting matrix to a real number; and defining a mapping of said first voting matrix to an expected voting matrix to be expected when a component is modified and evaluators who have agreed to said component before modification vote neutral to said modified component with a given compromise probability. The components are then automatically scored based on an expected incremental effect of a component change on the overall disagreement level for a range of compromise probabilities specified; and for each component, a compromise probability is determined for which an expected incremental decrease of said overall disagreement function becomes positive, as each component's minimum compromise probability.

The method further includes: determining a relative improvement of a component change as a ratio of the expected incremental decrease in said overall disagreement function and the original overall disagreement level; electronically computing a scoring of the plurality of evaluators, according to a slope of the overall disagreement function; electronically generating two lists, wherein the first list includes the scored components detailing respective non-neutral votings of the evaluators, and the second list includes the scored evaluators detailing respective non-neutral votings of the evaluators; selecting components to be modified on the basis of said lists; providing alternative versions for said components to be modified, according to the collected comments.

The alternative versions are subjected to a second round of voting by the evaluators to yield for each component a second voting matrix comprising of a respective column of the first voting matrix and columns containing the votes given to the alternative versions of the component; a transformation of the first voting matrix is defined if a particular alternative is adopted as a replacement for a respective column of the voting matrix; the components are electronically analyzed in an order of the scored components to select, for each component, an optimal alternative that yields a maximum incremental decrease in said overall disagreement function; and the optimal alternatives for the components are sorted, in an original order of the components to electronically assemble an optimal new version of the concept.

BRIEF DESCRIPTION OF THE DRAWINGS

FIGS. 1A, 1B, and 1C show an exemplary process flow, according to some embodiments of the present invention.

DETAILED DESCRIPTION

Figure 1A:
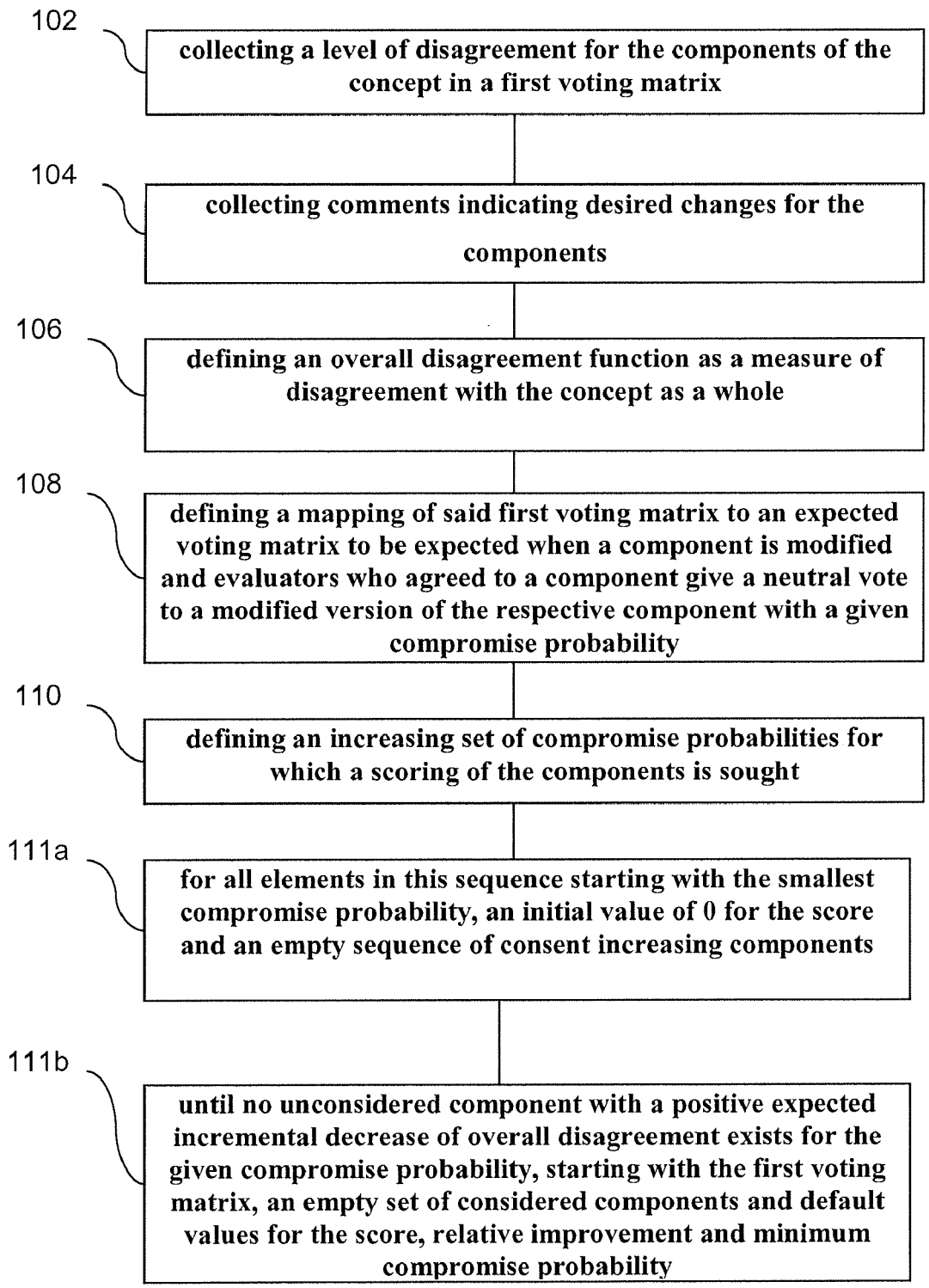

The present invention relates to the scoring of changes of components of a proposal according to their potential to increase consent, based on the evaluations of different formulations of the proposal's components. Such evaluations are typically collected in a collective decision process, where a proponent invites a group of evaluators to provide feedback on his concept in the form of statements of agreement/disagreement and comments for the individual components that indicate desired modifications. In some embodiments, the method of the present invention is performed by one or more electronic devices, such as general purpose or special purpose computers.

Consider, for instance, the example result of a first round of vote collection shown in TABLE 1. Here, evaluators E1 to E9 voted on components C1 to C8, where consent is indicated by 1, disagreement with −1 and 0 stands for neutrality. $z_i$ denotes the number of disagreements and $w_i$ the number of neutral votes, per evaluator.

TABLE 1

| First Voting Matrix Example | | | | | | | | | | |
| --- | --- | --- | --- | --- | --- | --- | --- | --- | --- | --- |
| Evaluator | C1 | C2 | C3 | C4 | C5 | C6 | C7 | C8 | $z_i$ | $w_i$ |
| E1 | −1 | 1 | 1 | 1 | 1 | 1 | 0 | 0 | 1 | 2 |
| E2 | −1 | 0 | 0 | 1 | 0 | 0 | 0 | −1 | 2 | 5 |
| E3 | 0 | 1 | 0 | 1 | 1 | 1 | 0 | −1 | 1 | 3 |
| E4 | −1 | 1 | 1 | 0 | 0 | 0 | −1 | 0 | 2 | 4 |
| E5 | 0 | 0 | 0 | 1 | 1 | 0 | −1 | −1 | 2 | 4 |

TABLE 1-continued

First Voting Matrix Example

| Evaluator | C1 | C2 | C3 | C4 | C5 | C6 | C7 | C8 | $z_i$ | $w_i$ |
|---|---|---|---|---|---|---|---|---|---|---|
| E6 | 1 | −1 | −1 | −1 | 0 | −1 | 1 | 1 | 4 | 1 |
| E7 | 1 | 0 | −1 | −1 | −1 | −1 | 1 | 0 | 4 | 2 |
| E8 | 1 | −1 | −1 | −1 | 0 | −1 | 1 | 1 | 4 | 1 |
| E9 | 1 | −1 | −1 | 0 | −1 | −1 | 0 | 1 | 4 | 2 |
| Sum | 1 | 0 | −2 | 1 | 1 | −2 | 1 | 0 | 24 | 24 |

Additional to the votes, comments that indicate a desired change of a component were provided by the evaluators in the case of disagreement with a component. However, not all of these suggestions should be followed blindly, as when changing a component to accommodate dissent one has to consider that those evaluators that have agreed to the current version might disagree with the new version. Assuming that a formulation conforming to all the dissenters can be found, one therefore has to expect that in the worst case a change of a component will resemble to an inversion of the respective column in the voting matrix V, i.e. −1 will become 1 and 1 will become −1. Thus, if overall disagreement is measured by the sum of the number of disagreements over all evaluators, one should only change components for which the sum of all votes—the balance—is negative, as here the number of evaluators who supposedly change from disagreement to agreement is larger than the number of evaluators that are expected to switch from agreement to disagreement.

As can be seen from TABLE 1, in this example, only C3 and C6 have a negative balance of −2, i.e. modifying each to a formulation resembling to the preferences expressed in comments of evaluators E6 to E9 would result in a net reduction of overall disagreement by 2. Thus, when changing these components, one can expect that in the worst case in the next round of voting the transformed voting matrix depicted in TABLE 2 results.

TABLE 2

Expected Voting Matrix Example after Modifying C3 and C6

| Evaluator | C1 | C2 | C3 | C4 | C5 | C6 | C7 | C8 | $z_i$ | $w_i$ |
|---|---|---|---|---|---|---|---|---|---|---|
| E1 | −1 | 1 | −1 | 1 | 1 | −1 | 0 | 0 | 3 | 2 |
| E2 | −1 | 0 | 0 | 1 | 0 | 0 | 0 | −1 | 2 | 5 |
| E3 | 0 | 1 | 0 | 1 | 1 | −1 | 0 | −1 | 2 | 3 |
| E4 | −1 | 1 | −1 | 0 | 0 | 0 | −1 | 0 | 3 | 4 |
| E5 | 0 | 0 | 0 | 1 | 1 | 0 | −1 | −1 | 2 | 4 |
| E6 | 1 | −1 | 1 | −1 | 0 | 1 | 1 | 1 | 2 | 1 |
| E7 | 1 | 0 | 1 | −1 | −1 | 1 | 1 | 0 | 2 | 2 |
| E8 | 1 | −1 | 1 | −1 | 0 | 1 | 1 | 1 | 2 | 1 |
| E9 | 1 | −1 | 1 | 0 | −1 | 1 | 0 | 1 | 2 | 2 |
| Sum | 1 | 0 | 2 | 1 | 1 | 2 | 1 | 0 | 20 | 24 |

However, in many situations the number of components on which an evaluator disagrees has to be sufficiently low to induce consent with the concept as a whole. In such a case the above described modification of C3 and C6 might—in fact—result in a situation where dissent with the concept has increased as the agreement by evaluators E1 to E5, which so far have been quite favorable to the proposal, might be lowered so much that they become unfavorable to the concept as a whole while the consent of those not in favor so far, i.e. evaluators E6 to E9, might not have increased enough to make them favorable to the proposal.

In such a case, the proponent would employ the strategy of concentrating on winning those evaluators close to an overall agreement at the expense of discomforting clear opponents. For the scoring of components this means rather than simply trying to lower the unweighted sum of the individual disagreement levels as indicated by the simple scoring according to the balance introduced above one would assign weights to the evaluators based on their current overall disagreement level when calculating the impact of a component change on overall disagreement. For our example one could, for instance, assign weight 1 to the favourable evaluators E1-E5 and weight 0 to evaluators E6-E9 when calculating the balance. This yields an expected overall improvement of 3 for components C1 and C8 and of 2 for components C3, C6 and C7. As can be seen from TABLE 3, by changing e.g. components C1, C7 and C8 all objections of evaluators 1 to 5 can be accommodated so that the consent of the majority is obtained for sure, even though the total number of disagreements is increased to 26.

TABLE 3

Expected Voting Matrix Example after Modifying C1, C7 and C8

| Evaluator | C1 | C2 | C3 | C4 | C5 | C6 | C7 | C8 | $z_i$ | $w_i$ |
|---|---|---|---|---|---|---|---|---|---|---|
| E1 | 1 | 1 | 1 | 1 | 1 | 1 | 0 | 0 | 0 | 2 |
| E2 | 1 | 0 | 0 | 1 | 0 | 0 | 0 | 1 | 0 | 5 |
| E3 | 0 | 1 | 0 | 1 | 1 | 1 | 0 | 1 | 0 | 3 |
| E4 | 1 | 1 | 1 | 0 | 0 | 0 | 1 | 0 | 0 | 4 |
| E5 | 0 | 0 | 0 | 1 | 1 | 0 | 1 | 1 | 0 | 4 |
| E6 | −1 | −1 | −1 | −1 | 0 | −1 | −1 | −1 | 7 | 1 |
| E7 | −1 | 0 | −1 | −1 | −1 | −1 | −1 | 0 | 6 | 2 |
| E8 | −1 | −1 | −1 | −1 | 0 | −1 | −1 | −1 | 7 | 1 |
| E9 | −1 | −1 | −1 | 0 | −1 | −1 | 0 | −1 | 6 | 2 |
| Sum | −1 | 0 | −2 | 1 | 1 | −2 | −1 | 0 | 26 | 24 |

An obvious drawback of measuring the overall disagreement level as a function of votings on the individual components via the overall disagreement function $$d(V) = \sum_{i=1}^{5} z_i$$

is that the characterization of the target group as evaluators with $z_i < 4$ is quite arbitrary. A more general formulation of an overall disagreement function d(V) that assigns higher weights to reductions of the number of disagreements of evaluators with less disagreements is given as e.g.

$$d(V) = \sum_{i=1}^{5} d_i(z_i, w_i), \; d_i(z_i, w_i) = \ln(z_i + 1 + w_i/(m - z_i)), \quad (1)$$

where n is the number of evaluators and m the number of components. In this formulation, the dominant element is the number of disagreements, which is modified by the share of neutral votes in the components which were not objected. For this disagreement function and the example presented in TABLE 1, the values for the overall disagreement levels per evaluator $d_i(z_i, w_i)$ are displayed in the first line of TABLE 4. Here, for instance, a reduction of the number of disagreements of evaluator E1 by 1 results in an increase of overall consent by 0.604=0.827−0.223, while a reduction of the number of disagreements of evaluator E9 by 1 yields an increase of 0.223=1.705−1.482 only.

TABLE 4

Individual Overall Disagreement Levels for Example - Logarithmic d

| Iteration | E1 | E2 | E3 | E4 | E5 | E6 | E7 | E8 | E9 | Sum |
|---|---|---|---|---|---|---|---|---|---|---|
| 1 | 0.83 | 1.34 | 0.89 | 1.30 | 1.30 | 1.66 | 1.70 | 1.66 | 1.70 | 12.38 |
| 2 | 0.83 | 1.00 | 0.32 | 1.30 | 0.94 | 1.85 | 1.70 | 1.85 | 1.90 | 11.68 |
| 3 | 0.22 | 0.49 | 0.32 | 0.94 | 0.94 | 2.01 | 1.90 | 2.01 | 2.08 | 10.92 |
| 4 | 0.22 | 0.49 | 0.32 | 0.41 | 0.41 | 2.08 | 1.90 | 2.20 | 2.08 | 10.39 |

With this overall disagreement function, the impact of a component change on overall consent depends on the modifications made so far, so that one has to dynamically keep track of the level of overall disagreement of the relevant evaluators when contemplating a component change. Doing this by hand is unfeasible in real-world applications that yield voting matrices with thousands of rows and hundreds of columns. Therefore, the present invention in the first step supports the proponent by automatically scoring component changes according to the expected incremental decrease of a freely overall definable disagreement function.

For our example data in TABLE 1 and the overall disagreement function defined in formula (1), for instance, modifying component C8 in the worst case results in decreasing $z_i$ by 1 for evaluators E2, E3 and E5, and increasing $z_i$ by 1 for evaluators E6, E8 and E9. Therefore, the individual overall disagreement levels as defined in formula (1) change by −0.57 for evaluator E3, by −0.35 for evaluator E2 and E5 and by +0.19 for evaluators E6, E8 and E9. Summing these changes yields an expected decrease of overall disagreement by 0.70. Performing this computation for all components yields the first line in TABLE 5.

TABLE 5

Decreases in Overall Disagreement for Example - Logarithmic d

| Max. | C1 | C2 | C3 | C4 | C5 | C6 | C7 | C8 |
|---|---|---|---|---|---|---|---|---|
| C8 | 0.54 | −0.34 | 0.25 | −0.61 | −0.57 | 0.15 | 0.14 | 0.70 |
| C1 | 0.76 | −0.65 | 0.14 | −1.05 | −0.89 | −0.16 | 0.36 | |
| C7 | | −1.01 | −0.25 | −1.51 | −1.15 | −0.46 | 0.53 | |
| — | | −1.16 | −0.41 | −1.68 | −1.35 | −0.44 | | |

Here, the maximum improvement is obtained when changing component C8. Thus, C8 is the first element of the sequence of consent increasing components R and score 1 is assigned to this component. Implementing this modification yields to an inversion of column C8 in TABLE 1 and the new overall disagreement levels displayed on line 2 of TABLE 4. On this basis, the expected incremental decrease of overall disagreement is computed for the remaining components C1 to C7 to see whether consent can be improved further. This yields line 2 in TABLE 5. Here, component C1 yields the largest expected incremental improvement of 0.76. Therefore, this component is assigned score 2 and R is extended by C1 so that R=(C8, C1). Implementing this change results in the additional inversion of column C1 and the new overall disagreement levels for the voting matrix with inverted columns C1 and C8 as displayed on line 3 of TABLE 4. Repeating this process for the remaining components C2 to C7 yields that consent can be improved further by modifying component C7, which yields the largest expected incremental improvement of 0.53 in line 3 of TABLE 5. Therefore, C7 receives score 3, and R=(C8, C1, C7). Implementing this change additional to changing C1 and C8 results in the voting matrix displayed in TABLE 3 and the overall disagreement levels displayed on line 4 of TABLE 4. The next iteration of this procedure yields the expected incremental improvements displayed in line 4 of TABLE 5. All are negative, so that the sequence of consent improving components has been completely generated for the worst case. Here, the proponent can expect to decrease the overall disagreement level by 16.1% from 12.38 to 10.39 by changing components C8, C1 and C7. The computed scores resemble to the indices of the elements in the sequence of consent increasing components and guide the proponent in the task of prioritizing component changes.

So far, this is a very conservative scoring method, as additional changes of components might be beneficial if evaluators agreeing to the current version of a component do not adamantly disagree to any changes. To cover such situations, we extend the analysis to cases where evaluators that have agreed to a component become neutral to a new version of a component, i.e. give vote 0 to it, with a compromise probability p. In this case, the expected transformation of a consenting vote is $0 \cdot p - 1 \cdot (1-p) = p - 1$, with the worst case described above being the special case of p=0. Usually, the proponent is interested in a scoring of change proposals for a range of compromise probabilities. Here, the sequence of consent increasing components is determined by starting with the above described procedure with the smallest p. When the sequence of consent increasing components has been completely determined for this value for p, the compromise probability is increased to the next higher value and R is extended by the components that increase consent for the higher p and are not in R. This is repeated for all compromise probabilities supplied by the proponent.

If the compromise probability is high, many components can become consent increasing. To assist the proponent in selecting efficient component modifications, the compromise probability at which the component became consent increasing and the expected incremental decreases of overall disagreement relative to the original overall disagreement level d(V) per p are provided besides the score of a component. The proponent can compare the minimum compromise probabilities reported with the acceptance chances of reformulations to judge the risk of a component change, and he can relate the relative improvements to the effort necessary to draft a modification.

Clearly, the method works for definitions of overall disagreement functions and voting matrix transformations other than those used in the example, too. Let us now describe the proposed method in general. In some embodiments, the method of the present invention starts by assembling (collecting) the votes given to the components of the proposal by the evaluators in a first round of feedback in a first voting matrix V defined as follows:

$$V = \{v_{ij}\}, i=1,\ldots,n, j=1,\ldots,m, v_{ij} \in D_V \quad (2)$$

where

| | |
|---|---|
| $v_{ij}$: | evaluation given by evaluator i for component j |
| n: | number of evaluators |
| m: | cardinality of the ordered set of components C |
| $D_V$: | set of possible votes, $D_V = \{-1, \ldots, 0, \ldots, u\}$, where 0 denotes neutrality, negative values dissent and positive ones agreement with the component. |

In some embodiments, it is not necessary that the actual voting by the evaluators on the components is done using this scale. Rather, a representation in $D_V$ can also be achieved through a proper transformation. For instance, if the voting is done using a 5-scale Likert scale one could encode 1 and 2 by −2 and −1, 3 by 0 and 4 and 5 by 1 and 2 to achieve a voting matrix that conforms to (2).

The disagreement to the proposal as a whole (overall disagreement) is measured by a freely definable overall disagreement function d(V) that maps a voting matrix to a real number. The choice of a particular overall disagreement function depends on the goals and background knowledge of the proponent.

The expected effect of modifying a component k for a given compromise probability p is described by a transformation (mapping) t(V,k,p) that yields a transformed voting matrix V'=(V,k,p). For instance, one could assume $$t(V, k, p) = V' = \{v'_{ij}(k, p)\}, v'_{ij}(k, p) = \begin{cases} 1(p-1) & \text{if } v_{ij} = 1 \text{ and } j = k \\ v_{ij} & \text{if } v_{ij} = 0 \text{ or } j \neq k \\ u & \text{otherwise,} \end{cases} \quad (3)$$

that is, the original voting is preserved for unchanged components and neutral votes, disagreements are changed to agreements and with compromise probability p an agreeing evaluator becomes neutral to a modification so that the expected result of a component change on a consenting vote is given as $0 \cdot p - 1 \cdot (1-p) = 1 \cdot (p-1)$.

The general procedure for scoring component changes based on the expected incremental decrease of overall disagreement is described in (4). Here $s_j$ is the score of component j, R is the sequence of content increasing components, S is the set of considered components for a particular compromise probability p and P is the increasing sequence of compromise probabilities p supplied by the proponent. $g_j$ denotes the incremental decrease of overall disagreement expected when changing component j. The minimum compromise probability of component j is denoted by $p_j^{min}$ and the relative improvement achieved through the changing of j when the compromise probability has value p is denoted by $improv_{jp}$. For components that do not improve consent $s=\infty$, $p_j^{min}=\infty$ and $impr_{jp}=0$.

$i \leftarrow 0, R=\{\ \}, s_j=\infty, p_j^{min}=\infty \forall j \in C, improv_{jp}=0 \forall j \in C, p \in P$ for all $p \in P$ do $S \leftarrow \{\ \}, V' \leftarrow V$ $g_j \leftarrow d(V')-d(t(V',j,p)), \forall j \in C$ while $\exists g_j > 0$ do $k \leftarrow \arg\max g, S \leftarrow S \cup \{k\}$ $V' \leftarrow t(V',k,p), improv_{kp} \leftarrow g_k * 100/d(V)$ if $k \in R$ then $i \leftarrow i+1, s_k \leftarrow i, p_k^{min} \leftarrow p, R \leftarrow R,k$ endif $g_j \leftarrow d(V')-d(t(V',j,p)), \forall j \in C \setminus S$ end while end for (4)

TABLE 6 contains the scores $s_j$, minimum compromise probabilities $p_j^{min}$ and relative improvements $improv_{jp}$ for selected values of p for our example.

TABLE 6

Scores, Minimum Compromise Probabilities and Relative Improvements per p for Example

| Component | $s_j$ | $p_j^{min}$ | 1 | 0.5 | 0.2 | 0.1 | 0 |
|---|---|---|---|---|---|---|---|
| C1 | 2 | 0 | 10.53 | 8.87 | 7.22 | 6.68 | 6.13 |
| C2 | 6 | 0.5 | 8.6 | 0.72 | — | — | — |
| C3 | 4 | 0.5 | 7.21 | 0.70 | — | — | — |
| C4 | 7 | 0.6 | 11.57 | — | — | — | — |
| C5 | 8 | 0.6 | 8.71 | — | — | — | — |
| C6 | 5 | 0.5 | 8.7 | 2.19 | — | — | — |
| C7 | 3 | 0 | 8.71 | 6.57 | 5.36 | 5.36 | 4.29 |
| C8 | 1 | 0 | 11.6 | 7.88 | 6.54 | 6.54 | 5.66 |
| Sum | | | 75.62 | 26.93 | 19.12 | 17.66 | 16.08 |

For instance, if on the basis of the comments provided the proponent estimates that a compromise probability of 0.5 is plausible and considers an improvement of at least 5% necessary to justify the effort of reformulating a component, column 5 of TABLE 6 tells him that he should change components C1, C7 and C8.

In addition to the scoring of the components, component selection and reformulation can be supported by a scoring of the evaluators according to the slope of the respective term in the overall disagreement function, i.e. for instance $\Delta d_i = d_i(z_i, w_i) - d_i(z_i-1, w_i)$ for d(V) as specified in formula (1). Comments and objections of evaluators with larger scores should be given a higher priority than those of evaluators with lower scores. This scoring can also be used to check the plausibility of the selected overall disagreement function and for the fine-tuning of its specification.

The scorings of components and evaluators can be represented by two tables. TABLE 7 contains the respective columns, where the detail always lists the entities belonging to the summary line, i.e. the component detail lists the non-neutral votings of the various evaluators for the respective component, while the evaluator detail lists the non-neutral votings of the respective evaluator for the various components. Here, balance denotes the respective column (components) and row (evaluators) sum of the voting matrix. Additionally, the balance based on an original voting in case the votings were transformed to conform to $D_V$ can be reported, too.

TABLE 7

User Interface - Columns of the Result Tables

| Component Table | Component Detail | Evaluator Table | Evaluator Detail |
|---|---|---|---|
| Component j | Evaluator i | Evaluator i | Component j |
| #Votes $cv_j$ | Vote $v_{ij}$, $v_{ij} \neq 0$ | #Votes $ev_i$ | Vote $v_{ij}$, $v_{ij} \neq 0$ |
| #Comments $cnc_j$ | Comments $com_{ij}$ | #Comments $enc_i$ | Comments $com_{ij}$ |
| Component Balance $cb_j$ | Evaluator Balance $eb_i$ | Evaluator Balance $eb_i$ | Component Balance $cb_j$ |
| Component Score $s_j$ | Evaluator Current Overall Disagreement $d_i(z_i, w_i)$ | Evaluator Current Overall Disagreement $d_i(z_i, w_i)$ | Component Score $s_j$ |
| Min. Compromise Prob. $p_j^{min}$ | Evaluator Score $\Delta d_i$ | Evaluator Score $\Delta d_i$ | Min. Compromise Prob. $p_j^{min}$ |
| Rel. Improvements $improv_{jp}$ | | | Rel. Improvements $improv_{jp}$ |

The method for producing the lists after executing procedure (4) is described in (5), where the notation can be found in TABLE 7.

$$
\begin{aligned}
&\text{for } i = 1,\ldots,n \text{ do } /* \text{ evaluator list } */ \\
&\quad \Delta d_i = d_i(z_i, w_i) - d_i(z_i - 1, w_i), \\
&\quad eb_i = \sum_{j=1}^{m} v_{ij},\ ev_i = m - w_i \\
&\quad \text{output } i, ev_i, enc_i, eb_i, d_i(z_i, w_i), \Delta d_i \\
&\quad \text{for } j = 1,\ldots,m \text{ do } /* \text{ component detail } */ \\
&\quad\quad cb_j = \sum_{i=1}^{n} v_{ij} \\
&\quad\quad \text{if } v_{ij} \neq 0 \text{ output } j, v_{ij}, com_{ij}, cb_j, s_j, p_j^{min}, improv_{jp} \\
&\quad \text{end for} \\
&\text{end for} \\
&\text{for } j = 1,\ldots,m \text{ do } /* \text{ component list } */ \\
&\quad cv_j = |\{v_{ij} \neq 0, i = 1,\ldots,n\}| \\
&\quad \text{output } j, cv_j, cnc_j, cb_j, s_j, p_j^{min}, improv_{jp} \\
&\quad \text{for } i = 1,\ldots,n \text{ do } /* \text{ evaluator detail } */ \\
&\quad\quad \text{if } v_{ij} \neq 0 \text{ output } i, v_{ij}, com_{ij}, eb_i, d_i(z_i, w_i), \Delta d_i \\
&\quad \text{end for} \\
&\text{end for}
\end{aligned}
\tag{5}
$$

A self-evident modification of the overall disagreement function in formula (1) is the case when the proponent assumes that the evaluators are tolerant to a given number of disagreements so that consent cannot be raised by reducing disagreements below this number. For our example a tolerance limit of 1 yields that only components C7 and C8 should be changed, resulting in the values 1, 1, 0, 1, 0, 6, 5, 6 and 5 for $z_i$.

In other applications, a proponent could try to accommodate opposing evaluators at the expense of consenting ones. In this case a suitable specification of the overall disagreement function could be:

$$d(V) = \sum_{i=1}^{n} d_i(z_i, w_i),\ d_i(z_i, w_i) = \exp(z_i + 1 + w_i/(m - z_i)). \tag{6}$$

For such an exponential overall disagreement function changes of disagreements to agreements by evaluators with larger values for $z_i$ have a higher impact on the overall agreement level than those with smaller values. For our example, this specification yields the same result as $$d(V) = \sum_{i=1}^{n} z_i.$$

This is also observed if disagreement function (1) with limit 2 is employed.

If one interprets the components of the proposal as items of a test for the latent trait "agreement to the proposal" where the votes are the respective affective values, the overall disagreement functions discussed so far can also be seen as deterministic response functions to the components proposed by the proponent in the sense of a Rasch model. An overview of Rasch modeling is described in Trevor G. B, Fox, Ch. M., Applying the Rasch Model: Fundamental Measurement in the Human Sciences, Lawrence Erlbaum Associates Inc; $2^{nd}$ Ed., 2007, the entire contents of which is herein expressly incorporated by reference. Based on this insight one can also empirically determine an overall disagreement function by estimating one or—if the number of components is larger than the number of evaluators—several probabilistic mixed ordinal Rasch models per section on the basis of the voting matrix. Here, the response is stochastic, that is, the probability of vote x for component j by evaluator i is given as $$P(X_{ij} = x) = \sum_{g=1}^{G} \pi_g \frac{\exp(x\theta_{ig} - \sigma_{jxg})}{\sum_{s=0}^{m} \exp(s\theta_{ig} - \sigma_{jsg})} \tag{7}$$

where

| | |
|---|---|
| $P(X_{ij} = x)$: | probability that evaluator i votes $x \in D_V$ for component j |
| $\pi_g$: | probability of belonging to cluster g |
| $\theta_{ig}$: | person parameter of evaluator i in group g |
| $\sigma_{jsg}$: | threshold parameter for vote s for component j in group g. |

On this basis, empirically estimated overall disagreement functions can be defined, such as the expected overall disagreement $$d(V) = \sum_{i=1}^{n} \sum_{k=-1}^{u} kP(X_{ij} = k). \quad (8)$$

A mixed ordinal Rasch model can provide additional insights through the inspection of the model parameters. Item parameters with low scores in all groups can be considered safe candidates for change, while differences between group specific item parameters indicate the necessity of trading off conflicts between groups. The person parameters can be used to characterize target groups with respect to responsiveness to component changes, as a more general version of a scoring of evaluators by the slope of the disagreement function.

To see whether the expectations used to score the components in the first step of the method hold, the alternative versions of the components selected on the basis of (5) are presented to the evaluators for a second round of voting. Let us assume that in our example C1, C7 and C8 have been selected for modification and that one alternative formulation C1', C7' and C8' for each of the components C1, C7 and C8 has been drafted and evaluated in the $2^{nd}$ round voting as shown in TABLE 8.

TABLE 8

$2^{nd}$ Round - Voting on Alternative Formulations of C1, C7 and C8

| Evaluator | C1' | C7' | C8' |
|---|---|---|---|
| E1 | −1 | 1 | 0 |
| E2 | −1 | 1 | 1 |
| E3 | 0 | 0 | 1 |
| E4 | −1 | 1 | 0 |
| E5 | 0 | 1 | 1 |
| E6 | −1 | 1 | 0 |
| E7 | 0 | −1 | 0 |
| E8 | −1 | −1 | 0 |
| E9 | 0 | −1 | 1 |

Comparing TABLE 3 with TABLE 8 one finds that the expectations with regard to the modification of component C7 and C8 have largely been met, while the alternative given for C1 did not receive the agreement aimed for. To automatically select the alternatives which yield a maximum improvement the votes received in the second round are combined with V, the first round voting matrix, to obtain second voting matrices $A_k = \{a_{ijk}\}, i=1,\ldots,n, j=1,\ldots,l_k, k=1,\ldots,m, a_{ijk} \in D_V$, where the first column contains the original voting, i.e. column k of V, and the additional $l_k - 1$ columns are the votings for the alternatives. Then the transformed voting matrix $\overline{V}$ obtained if alternative l is chosen for component k is given by the transformation $$u(V, A_k, l) = \overline{V} = \{\overline{v_{ij}}(A_k, l)\}, \overline{v_{ij}}(A_k, l) = \begin{cases} v_{ij} & \text{if } j \neq k \\ a_{ilk} & \text{else.} \end{cases} \quad (9)$$

i.e., column k of the first voting matrix is replaced by the respective column l of the second voting matrix for k.

On this basis the method traverses the components in the order of the component score produced in step 1 and selects for each component the alternative for which the incremental improvement $d(\overline{V}) - d(u(\overline{V}A_k, l))$ is maximal. Denoting the elements of the sequence of consent increasing components R extended by the elements in C that are not in R with r, the number of alternatives formulated for r with m(r) and the optimal alternative selected for r with alt(r) one thus arrives at the following procedure:

$\overline{V} \leftarrow V, j \leftarrow 0$ for all $r \in R, C \setminus R$ do $h_l d(\overline{V}) - d(u(\overline{V}, A_r, l)), l = 1, \ldots, m(r)$ $k \leftarrow \arg \max h$ improv$_r \leftarrow h_k * 100/d(V)$ alt$(r) \leftarrow k, \overline{V} \leftarrow u(\overline{V}, A_r, k), j \leftarrow j+1$ output $j, r$, alt($r$), improv$_r$ end for  (10)

TABLE 9 shows the results for our example.

TABLE 9

$2^{nd}$ Step - Optimal Alternaives for Example

| Score $s_j$ | Component r | Optimal Alternative alt(r) | Rel. Improvement improv$_r$ |
|---|---|---|---|
| 1 | C8 | 2 | 9.50 |
| 2 | C1 | 1 | 0 |
| 3 | C7 | 2 | 3.93 |
| 4 | C3 | 1 | 0 |
| 5 | C6 | 1 | 0 |
| 6 | C2 | 1 | 0 |
| 7 | C4 | 1 | 0 |
| 8 | C5 | 1 | 0 |
| Sum | | | 13.43 |

Thus, the consent to the new version has increased by 13.43%, which is slightly lower than the original worst case expectation of 16.1%. The optimal new version of the concept is obtained by sorting TABLE 9 according to the order of the component set C and assembling the optimal alternatives as given in column 3, i.e. in our example the first six components should remain unchanged while components C7 and C8 should be replaced by the respective alternative formulation.

Figure 1C:
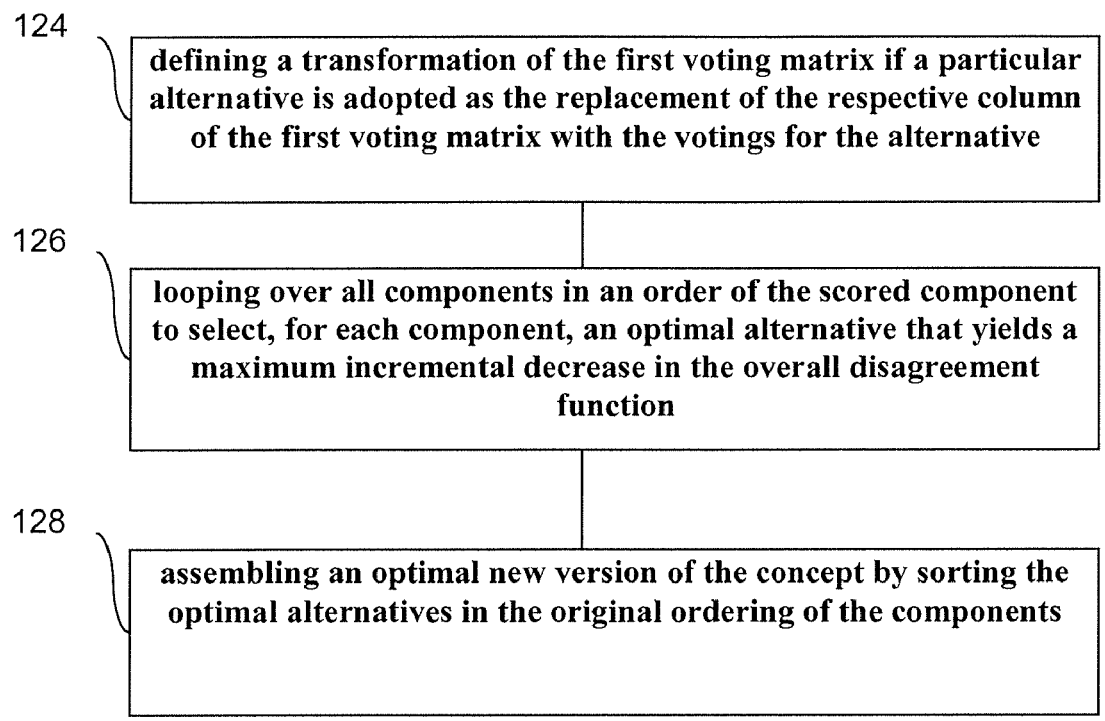

FIGS. 1A, 1B, AND 1C depict an exemplary process flow, according to some embodiments of the present invention. As shown in block 102, a level of agreement and a level of disagreement for the components of the concept are electronically collected in a first voting matrix. The first voting matrix may be in a freely definable scale. In block 104, comments indicating desired changes for the components are electronically collected from the evaluators. In block 106, an overall disagreement function is defined as a measure of disagreement with the concept as a whole. In block 108, a mapping is defined that for a given voting matrix yields the voting matrix to be expected when a component is modified and consenting evaluators become neutral to a component change, i.e. gives vote 0 to the new version, with a given compromise probability. In Block 110, the increasing sequence of compromise probabilities for which a scoring is sought is specified.

Block 112 is iterated for the sequence of increasing values of the compromise probability specified in block 110, starting with a score to be determined of 0 and an empty sequence of consent increasing components. Nested within this loop is a loop over all components whose change yields an expected improvement for the particular compromise probability given, which starts with the first voting matrix and an empty set of considered components. At first, the unconsidered component whose change yields the largest positive expected incremental decrease of overall disagreement for the given compromise probability is determined. Then the respective transformation of the voting matrix is applied, the relative improvement is computed as the ratio of the expected incremental decrease of overall disagreement and the original overall disagreement level and the component is added to the set of considered components. If the component selected is not element in the sequence of consent increasing components, the score is incremented by 1 and assigned to the component, the component is appended to the sequence of consent increasing components, and the compromise probability is recorded as the minimum compromise probability of the component.

A scoring of the plurality of evaluators is electronically computed, according to a slope of the disagreement function, in block 114. The slope of the disagreement function is indicative of a change in overall disagreement if the disagreement level of the respective evaluator is reduced. The invention then electronically generates two lists, the first list including the scored components detailing the respective non-neutral votings of the evaluators, and the second list including the scored evaluators detailing their non-neutral votings, in block 116. The lists may be displayed on a display device, such as a computer or electronic device display. In this way, the proponent is supported in the selection of those components whose modification promises the greatest impact with the least risk and in targeting the evaluators with the greatest impact in block 118.

In block 120, the invention drafts alternative formulations for the components selected in block 118 according to comments. The invention then collects a level of agreement and a level of disagreement for the alternatives drafted in block 120, and assembles second round voting matrices containing the first voting matrix and the votings of the alternatives in block 122. In block 124, a mapping that yields the voting matrix obtained when choosing a particular alternative is defined as the replacement of the respective column of the first voting matrix with the votings for the alternative. The invention then electronically analyzes the components in an order of the component score to select for each component the alternative that yields a maximum incremental decrease in overall disagreement, in block 126. In block 128, the resulting optimal new version of the concept is assembled by sorting the optimal alternative per component in an original ordering of the components.

The method of the present invention is broadly applicable to support a wide class of collective decision processes. Such processes are conducted, for example, when passing new legislation, deciding about public construction projects, developing strategies, policies or organizational designs within organizations and designing new products and services with user communities. Clearly, mobilizing many evaluators and generating many votes and comments is a success factor for such undertakings, and collective decision processes conducted on the internet support this goal by greatly reducing the costs of participation for the evaluators and the communication costs of the proponent.

The determination of the changes that increase consent becomes the more difficult the more complex a proposal is and the more evaluators contribute by voting and commenting, as for reasonable overall disagreement functions, one has to keep track of the respective individual overall disagreement levels when investigating alternative formulations of components.

The method of the present invention decomposes this complex problem into two steps. In a first round of evaluations, feedback is given via comments indicating desired changes and statements of agreement/disagreement on the component level. These statements are then used to select promising candidates for increasing consent with the support of on an automatic scoring procedure based on the expected incremental effect of a component change on the overall disagreement level for different compromise probabilities. In the second step, alternatives for reformulations of the components selected in the first step are drafted and distributed for another round of voting. Then, the components are scrutinized in an order given by the score produced in the first step to select the alternative that maximizes the incremental decrease in overall disagreement. Additionally, the evaluators are scored according to the slope of the overall disagreement function.

The method of the present invention can be tailored to the specifics of a collective decision process in various ways. On the one hand, the voting scale is freely definable. On the other hand, the overall disagreement function, the transformation of a voting matrix through component modifications and the range of interesting compromise probabilities can be freely defined, depending on the background knowledge and goals of the proponent. An analogy to the theory of Rasch modeling can be employed for empirically estimating probabilistic overall disagreement functions.

Furthermore, the method of the present invention may be performed by any electronic device, such as, general purpose computers, personal computers, dedicated processors, mobile computing devices, and the like. Also, the steps of the invention may be performed by different electronic devices (remotely) connected together. For example, one or more steps may be performed by a computer in a central location and one or more steps may be performed by a mobile computing device.

It will be recognized by those skilled in the art that various modifications may be made to the invention illustrated and any other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A method, executed by an electronic device, for scoring proposed changes of components of a concept for feedback by a plurality of evaluators, the method comprising:
   electronically collecting a level of agreement and a level of disagreement for the components of the concept in a first voting matrix, where disagreeing votes have a negative value, agreeing votes have a positive value and neutral votes have a 0 value;
   electronically collecting comments indicating desired changes to the components, from the plurality of evaluators;
   defining an overall disagreement function as a measure of a total of said collected level of disagreement with the concept as a whole that maps said first voting matrix to a real number;
   defining a mapping of said first voting matrix to an expected voting matrix to be expected when a component is modified and evaluators who have agreed to said component before modification vote neutral to said modified component with a given compromise probability;
   automatically scoring the components based on an expected incremental effect of a component change on the overall disagreement level for a range of compromise probabilities specified;

for each component, determining a compromise probability, for which an expected incremental decrease of said overall disagreement function becomes positive, as each component's minimum compromise probability;

determining a relative improvement of a component change as a ratio of the expected incremental decrease in said overall disagreement function and the original overall disagreement level;

electronically computing a scoring of the plurality of evaluators, according to a slope of the overall disagreement function;

electronically generating two lists, wherein the first list includes the scored components detailing respective non-neutral votings of the evaluators, and the second list includes the scored evaluators detailing respective non-neutral votings of the evaluators;

selecting components to be modified on the basis of said lists;

providing alternative versions for said components to be modified, according to the collected comments;

subjecting said alternative versions to a second round of voting by the evaluators to yield for each component a second voting matrix comprising of a respective column of the first voting matrix and columns containing the votes given to the alternative versions of the component;

defining a transformation of the first voting matrix if a particular alternative is adopted as a replacement for a respective column of the voting matrix;

electronically analyzing the components in an order of the scored components to select, for each component, an optimal alternative that yields a maximum incremental decrease in said overall disagreement function; and sorting the optimal alternatives for the components, in an original order of the components to electronically assemble an optimal new version of the concept.

2. The method of claim 1, wherein the first and second voting matrices $V=\{v_{ij}\}$, $i=1,\ldots,n$, $j=1,\ldots,m$ and $A_k=\{a_{ijk}\}$, $i=1,\ldots,n$, $j=1,\ldots,l_k$, $k=1,\ldots,m$, $a_{ijk} \in D_V$ are in a freely definable scale where n is the number of evaluators, m the cardinality of the ordered set of components C, $l_k$ the number of alternatives provided for component k and $D_V=\{-1,\ldots,0,\ldots,u\}$, 0 denoting neutrality, negative values dissent and positive ones agreement with the component.

3. The method of claim 1, wherein the overall disagreement function $d(V)$ that maps said first voting matrix to a real number and the transformation (mapping) $t(V,k,p)$ that describes the expected effect of modifying a component k for a given compromise probability p on said first voting matrix V are freely definable.

4. The method of claim 1 further comprising specifying an increasing sequence P of said compromise probabilities p.

5. The method of claim 1, further comprising an outer loop, in which the compromise probability p is increased, starting with the smallest value in P until all values in P are considered, initially setting the score to be determined to 0, wherein the sequence of consent increasing components R is empty and the components are assigned default values for the score, and defining the minimum compromise probability and the relative improvement as $s_j=\infty$, $p_j^{min}=\infty \forall j \in C$, $improv_{jp}=0 \forall j \in C$, $p \in P$; and an inner loop, in which components with an expected incremental positive decrease of overall disagreement function are determined for the compromise probability p, wherein initially, the set of considered components S is empty, the transformed voting matrix is the first voting matrix V, i.e. $V' \leftarrow V$, and the expected incremental decrease of overall disagreement $g_j$ is determined as $g_j \leftarrow d(V')-d(t(V',j,p))$, the difference of the current overall disagreement level and the overall disagreement level if component j is changed for all components, while an unconsidered component with $g_j>0$ exists, the component with the maximum improvement $k \leftarrow argmax\ g$ is added to the set of considered components S, a new transformed voting matrix is computed by applying the respective transformation $V' \leftarrow t(V',k,p)$ and the relative improvement achieved by changing component k, when the compromise probability is p is computed as $improv_{kp} \leftarrow g_k * 100/d(V)$, and if k is not an element of the sequence of consent increasing components, k is appended to R, $R \leftarrow R,k$, the score is incremented by one and assigned to component k and the compromise probability p is recorded as the minimum compromise probability $p_k^{min}$ for k, the improvements $g_j \leftarrow d(V')-d(t(V',j,p))$ are computed for the remaining unconsidered components $j \in C \backslash S$ and the procedure is repeated starting with the check whether a component j exists for which $g_j>0$.

6. The method of claim 1, wherein the score of an evaluator is computed as a difference between a current individual disagreement level and the individual disagreement level, if the number of disagreements is reduced by one.

7. The method of claim 1, further comprising producing a list of these evaluators' scores and statistics, and providing the scoring and the statistics for those components j for which a respective evaluator i has given a non-neutral vote $v_{ij} \neq 0$.

8. The method of claim 1, further comprising producing a list of the component scores and statistics, and providing the scoring and other statistics for those evaluators i which have given a non-neutral vote $v_{ij} \neq 0$ for the respective component j.

9. The method of claim 1, further comprising selecting component for which a modification is efficient by comparing the minimum compromise probabilities reported with acceptance chances of reformulations to judge the risk of a component change, and by relating the relative improvements to the effort necessary to draft a modification.

10. The method of claim 1, further comprising drafting alternative version of said selected components.

11. The method of claim 1, further comprising subjecting said alternative version to a second round of voting, yielding a level of agreement and a level of disagreement for the alternative versions.

12. The method of claim 1, wherein the second round of voting is combined with the first voting matrix to obtain for each component a second voting matrix $A_k=\{a_{ijk}\}$, $i=1,\ldots,n$, $j=1,\ldots,l_k$, $k=1,\ldots,m$, $a_{ijk} \in D_V$, wherein the first column contains the respective column of the first voting matrix, and the additional columns contain the votings for the alternative versions.

13. The method of claim 1, wherein a choice of alternative l for component k results in a transformed voting matrix $$u(V, A_k, l) = \overline{V} = \{\overline{v_{ij}}(A_k, l)\}, \overline{v_{ij}}(A_k, l) = \begin{cases} v_{ij} & \text{if } j \neq k \\ a_{ilk} & \text{else,} \end{cases}$$

where column k of the first voting matrix is replaced by a respective column of the second voting matrix for k.

14. The method of claim 1 wherein the incremental decrease in overall disagreement function achievable by selecting an alternative l is computed as $h_l \leftarrow d(\overline{V}) - d(u(\overline{V}, A_r, l))$, $\forall r \in R, C \backslash R, l = 1, \ldots, m(r)$, where m(r) is the number of alternatives drafted for component r.

15. The method of claim 14, wherein for each component, the alternative is chosen for which $h_l$ becomes maximal.

16. The method of claim 1, wherein the optimal new version of the concept is produced by displaying the optimal alternatives ordered in the original order of the components.

\* \* \* \* \*